Patented Oct. 10, 1922.

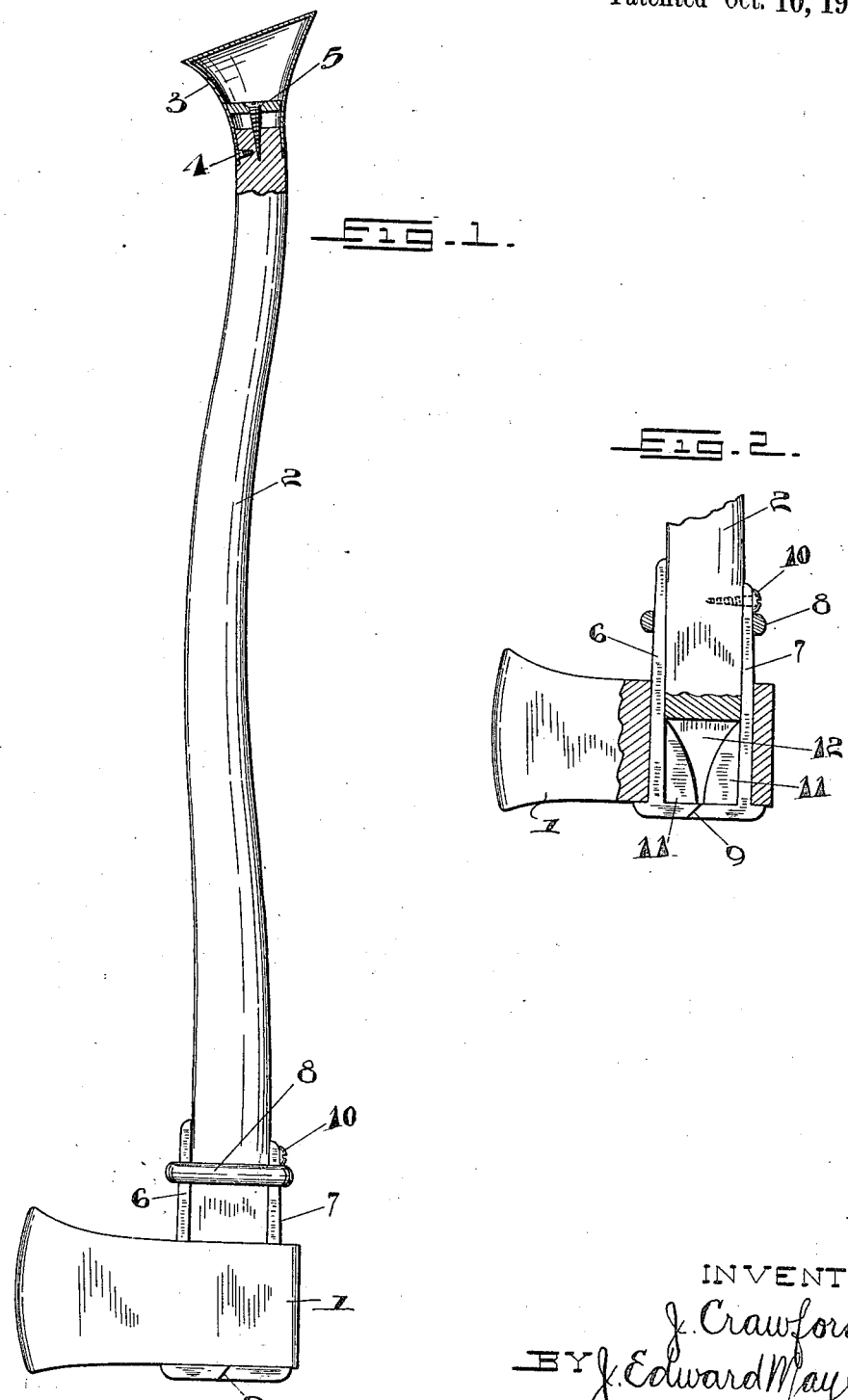

1,431,153

UNITED STATES PATENT OFFICE.

JOSIAH CRAWFORD, OF FEVERSHAM, ONTARIO, CANADA.

AX HANDLE.

Application filed August 15, 1921. Serial No. 492,462.

*To all whom it may concern:*

Be it known that I, JOSIAH CRAWFORD, of Feversham, in the county of Grey, Province of Ontario, Canada, a subject of the King of Great Britain, have invented certain new and useful Improvements in Ax Handles, of which the following is a specification.

This invention relates to handles for chopping axes, although the invention is also applicable to handles for picks or other tools which are provided with an eye into which the handle is driven or wedged, and the object of my invention is to devise an improved handle for this purpose, which handle will require considerably less material for its manufacture, and also to devise improved means for securing the handle and ax together to avoid any possibility of the ax accidentally becoming disengaged from the handle.

I attain my object by means of the constructions hereinafter described and illustrated in the accompanying drawings in which—

Fig. 1 is a view of my improved handle secured to an ax, the grip end of the handle being shown in section; and Fig. 2 a side elevation of part of the handle showing the parts for securing the ax in position.

In the drawings like numerals of reference indicate corresponding part in the different figures.

1 is an ax of any ordinary type and 2 the handle, of which 3 is the enlargement at the gripping end. In ordinary handles, which are turned down from a solid piece of wood, this enlargement 3 is formed as an integral part of the handle. This means that a very large amount of wood is wasted in turning the rest of the handle down to the proper size. Instead of turning the handle to shape, I prefer, however, to form the handle, less the enlargement 3 which is formed as a separate part, from a straight piece of wood, and to bring the handle to the proper shape by subjecting it to steam and then bending the handle to the desired shape in a suitable form. By making the enlargement 3 of a separate piece I am enabled to use considerably lighter material for the main part of the handle as the main portion is at the most never more than an inch in thickness, while the enlargement 3 is usually about 2 inches thick.

The enlarged portion 3 may be made as a casting or it may be formed up from sheet metal as may be desired, and the end of the main portion of the handle below the portion 3 will be suitably cut away so that the joint between the handle proper and the portion 3 will be flush.

Various ways may be devised for securing the portion 3 in position on the main portion of the handle. For instance a nail or screw 4 may be used for securing the parts together, or a bar 5 may be secured within the portion 3 and latter secured in position by a screw passing through a hole in this bar and into the end of the main part of the handle.

The end of the handle to which the ax is secured is as usual of the full thickness of the ax socket, but is not quite the full width. The end of the handle is inserted in the socket and into the socket at the edge of the handle nearest the cutting edge of the ax is driven a headed wedge member 6, while into the socket at the edge of the handle nearest the back of the ax is driven a headed wedge member 7. Each wedge member is provided with a tapered fin or rib 11 which is adapted to be received in a cut or slot 12 in the end of the handle to jam the sides of the handle tightly against the sides of the socket of the ax. These wedge members, it will be noted, extend considerably beyond the upper edge of the ax, and a band 8, which is usually placed on the handle before the handle is inserted in the ax socket, is driven down over the upper ends of the wedge members 6 and 7 and thus tightly grips them against the handle. Adjacent the upper end of one of the wedge members, preferably the member 7, is formed a suitable hole, through which a screw 10 may be driven, which screw will not only prevent the wedge from possibly working loose, but will also prevent the band 8 from working up off the wedges on to the handle.

Both wedge members might be held in position by means of screws, but I prefer to form the heads of the wedge members with inclined contacting faces 9 so that the inclined contacting face of one wedge member overlies the other. From the drawing, it will be noted, that the contacting face of the head of the wedge 7 is inclined to overlie the contacting face of the wedge 6, and thus when the parts are in position and the screw 10 in place that the wedge 6 is absolutely prevented from working loose.

It will also be noted that the front edge of the handle adjacent the ax is protected by the wedge 6 from being damaged in chopping. The wedge members and the special end on the handle can, of course, be used again and again should the handle become broken.

It will thus be seen that I have devised a construction which will satisfactorily attain the objects of my invention as set forth in the preamble to this specification. Handles formed in the manner described are not as liable to break as the grain of the wood follows the shape of the handle. By making the enlarged end as a separate piece there is a saving of approximately half the wood, and by the use of my improved means for locking the ax on the handle there is absolutely no danger of the ax becoming disengaged from the handle.

What I claim as my invention is:—

1. In an ax, the combination of a head having an eye therein; a handle adapted to be received in said eye; a pair of headed wedge members adapted to retain the head on the handle, said wedge members being of greater length than the depth of the eye, the heads of the wedge members being provided with contacting faces shaped so that the contacting face of the head of one wedge member overlies the contacting face of the other wedge member; and means for preventing the withdrawal of the wedge member having the overlying contacting face.

2. In an ax, the combination of a head having an eye therein; a handle adapted to be received in said eye; a pair of headed wedge members adapted to be driven in the eye between the handle and the head after the handle is in position in the eye to retain the head on the handle, said wedge members being of greater length than the depth of the eye, the heads of the wedge members being provided with contacting faces shaped so that the contacting face of the head of one wedge member overlies the contacting face of the other wedge member; a band encircling the handle and wedge members; and a screw securing the end of the wedge member with the overlying contacting face to the handle and adapted to retain the band in position.

Signed at Toronto, this 29th day of July, 1921.

JOSIAH CRAWFORD.